United States Patent [19]

Haws

[11] Patent Number: 4,665,386
[45] Date of Patent: May 12, 1987

[54] AUXILIARY KNOB FOR GAS VALVE TO ANNUNCIATE OPEN CONDITION

[76] Inventor: Spencer K. Haws, 6 May Ave., Mesa, Wash. 99434

[21] Appl. No.: 853,988

[22] Filed: Apr. 21, 1986

[51] Int. Cl.⁴ .................... G08B 21/00; F16K 37/00
[52] U.S. Cl. .................. 340/540; 340/547; 340/549; 340/686; 137/554; 251/292; 200/61.85; 200/61.86; 116/277; 116/112; 116/204
[58] Field of Search ........... 340/540, 549, 547, 548, 340/686-688, 692; 116/277, 112, 204, 92, 96, 97; 137/554; 251/292; 200/61.85, 61.86

[56] References Cited

U.S. PATENT DOCUMENTS 2,767,681 10/1956 Pontius ........................ 116/277
3,859,619 1/1975 Ishihara et al. ................ 137/554
3,994,255 11/1976 Thompson ..................... 116/277
4,518,008 5/1985 Fenster et al. ................. 137/554
4,629,157 12/1986 Tsuchiya et al. ............... 251/292

Primary Examiner—Donnie L. Crosland
Attorney, Agent, or Firm—Keith S. Bergman

[57] ABSTRACT

An electro-mechanical auxiliary knob structure, releasably attachable to a rotatable knob of a valve, to annunciate an open condition of that valve operated thereby. The auxiliary knob pivots relative to its attachment structure to switch electric circuitry carried within the auxiliary knob to annunciate last knob motion in the direction causing valve opening. The auxiliary knob is particularly adapted for use on valves of compressed gas tanks used in gas welding.

5 Claims, 6 Drawing Figures

U.S. Patent    May 12, 1987    4,665,386
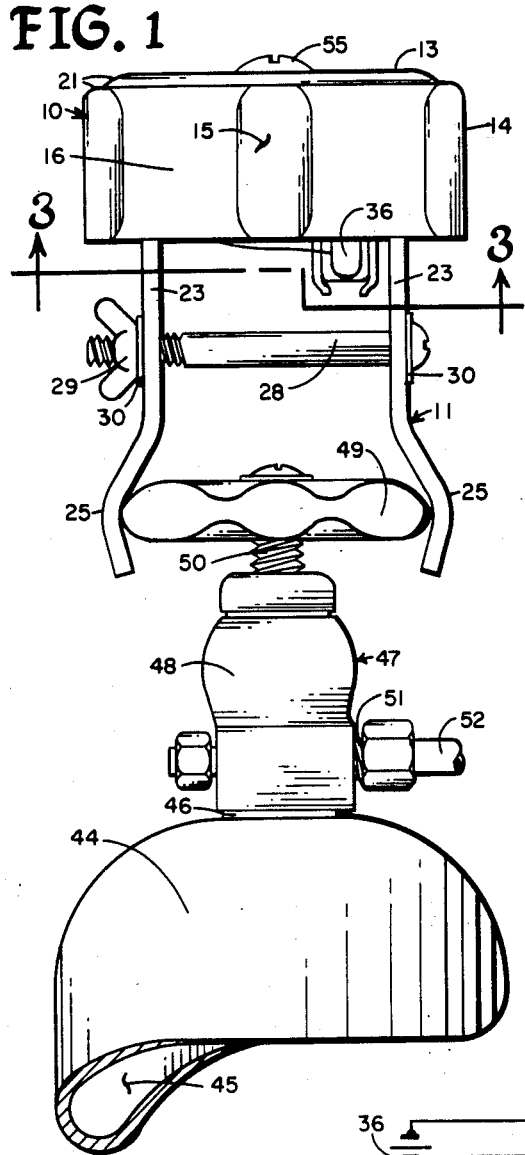
FIG. 1
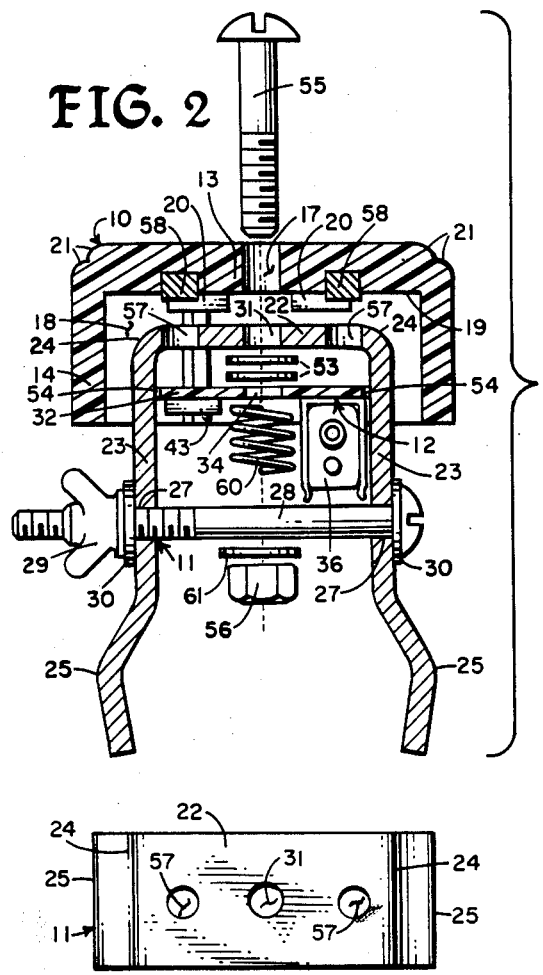
FIG. 2
FIG. 6
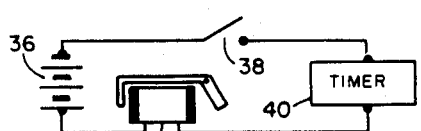
FIG. 5
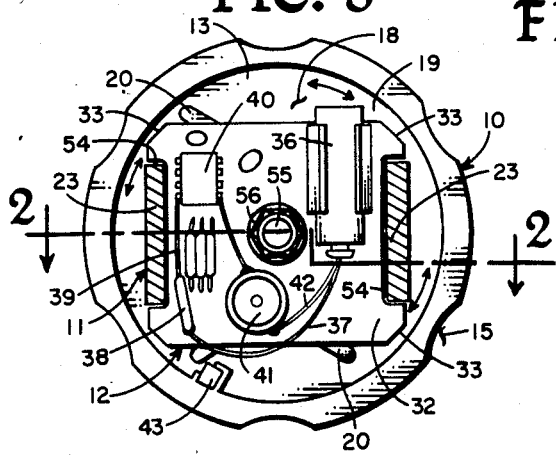
FIG. 3
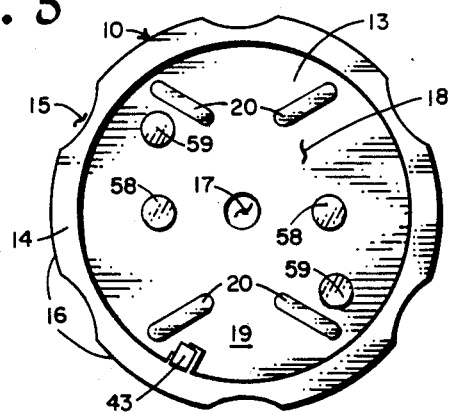
FIG. 4

4,665,386

AUXILIARY KNOB FOR GAS VALVE TO ANNUNCIATE OPEN CONDITION

RELATED APPLICATIONS

There are no applications related hereto heretofore filed in this or any foreign country.

FIELD OF INVENTION

My invention relates generally to valve condition annunciators and more particularly to an auxiliary knob that manipulates the principal knob of a rotatably operated value to annunciate last valve motion in an opening direction.

DESCRIPTION OF THE PRIOR ART

In fluid mechanics and processes, it is oftentimes desirable or necessary to know the condition of a valve regulating fluid flow. The valve condition may not be readily apparent from an external inspection, especially a visual observation, and even when once known the condition easily may be forgotten, as with the passage of time. These problems have long been recognized and responsive thereto many and various devices have become known to indicate and annunciate valve condition. The instant invention adds a new and novel member to this class of device.

Most valve structures provide some type of a manually manipulatable element such as a handle that is rotatably moved about an axis to responsively move a valving element relative to a seat for valve operation. This type of valve structure is epitomized by the so called "conic" or "pin" valve that is carried by a threaded stem which is rotated in a threadedly engaged housing to move the valve toward or away from an associated seat defined in the valve body. My invention is particularly adapted for use with such a valve, though its principle well may and does operate with other types of valving structures which provide reversible operation by moving an element in a pivotal or rotary fashion in opposite directions for opening and closing. My invention is especially adapted for use on ordinary rotatable valves as are commonly used on compressed gas cylinders to regulate gas flow therefrom.

Most condition indicating devices for valves having rotating operational elements have been an integral part of the valve and generally have been carried within the valve structure itself. This type of indicating device is necessarily limited to use only with the valve with which it is associated and it requires specialized valve structure and, generally, installation at the time of valve manufacture. My invention is distinguishable from this type of integrally contained condition indicator in that it is an auxiliary structure that is releasably fastenable to a primary valve knob and may be readily fastened or released as desired. My indicator requires no modification or specialized structure in the valve that it is to service and it may be successively used on a plurality of different valves and established thereon at any time.

My invention is a self-contained unit that internally carries its own powering source, sensing elements and annunciating mechanism. Most valve condition indicators of the prior art have had parts or elements external of the sensing valve structure and have annunciated at a point distant from the sensed valve. By reason of this, such devices have required some sensory communication, between valve condition sensor and annunciator, which oftentimes has been delicate and easily damaged or disruptable by accidental means or oftentimes by unknown or unrealized causes. This is especially true if the sensor and annunciator are interconnected by electrical wires or are sensibly interrelated by some wave-type aerial communication such as a radio device or light sensor.

Some valve condition indicating devices heretofore known have sensed something other than the physical condition of the valve per se to determine its state. Some such devices have sensed fluidic pressure on one or both sides of the valve, others have sensed fluid flow on one or both sides of the valve and some have sensed secondary physical conditions such as acoustical energy, vibrations or the like. All of the devices sensing such secondary indicators of valve condition may not indicate the true physical state of the valve in question and generally may be quite easily influenced by environmental conditions unrelated to valve condition. My invention is distinguishable from this class of indicating devices in that my invention senses an actual physical condition of the control handle of a serviced valve and, more particularly, the direction in which that control handle was last moved. This gives a positive and certain indication of valve state that is not related to secondary functions or conditions and is, therefore, a measure of a mechanical absolute, as opposed to secondary characteristics.

My invention generally may be used interchangably with any type of valve having a pivotally or rotatably operated control element. It is releasably interconnected externally of the principal control knob of a valve to be sensed and does not effect the internal structure or opeation of the valve nor does it require any modifications, changes or specialized structures in the valve. Most valve condition indicators of the prior art, that have not been internally contained in the valve structure itself, have been useful only on a particular valve, or limited class of valves, or have required modification or changes in structure of the valve to be serviced, all to readily distinguish such devices.

My invention differs from the prior art not in any one of its structures or functions per se, but rather in the synergistic combination of all of them to provide a new, novel and unobvious addition to the class of condition sensing devices for fluidic valves.

SUMMARY OF INVENTION

My invention generally provides an auxiliary knob pivotally carried on the back of a "U" shaped bracket which may be releasably fastened to the control knob of a gas valve to positionally maintain the auxiliary knob in operative position thereon.

The auxiliary knob is a peripherally defined structure with a medial chamber in its under portion and stops depending from the undersurface of the medial chamber top to limit pivotal knob motion relative to the supporting "U" bracket. The fastening bracket fixedly carries a rigid sensing board which in turn carries a proximity-type, position sensitive switch to annunicate sensing board motion in one direction relative to a magnet carried on the surface defining the medial chamber of the knob to sense direction of last motion of the of the control knob of the sensed valve to indicate open condition. The proximity switch regulates current in a battery powered, series connected electric circuit to annunicate a sensed open valve condition.

In providing such a device, it is:

A principal object of my invention to create an auxiliary knob type indicator that is releasably attachable to a control knob of a valve to indicate valve condition by sensing the direction of last motion of the control knob in an opening direction and annunciating that condition.

A further object of my invention, to provide such an indicator that is self-contained in a relatively small, releasably attachable auxiliary structure.

A still further object of my invention to provide such an indicator that allows an auxiliary knob to move, relative to its support, a predetermined angular distance in the direction of its last motion to allow that condition to be sensed by a position sensitive switch to cause subsequent annunciation through associated electric circuitry.

A still further object of my invention, to provide such an indicator that may be attached to many standard valves of commerce without specialized structures on or modifications in the valve to be serviced.

A still further object of my invention, to provide such an indicator that is of new and novel design, of rugged and durable nature, of high reliability and low maintenance, of simple and economic manufacture and one otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an orthographic surface view of my invention, in place upon an ordinary commercial valve in operational position on a partially shown compressed gas tank, showing its various parts, their configuration and relationship.

FIG. 2 is an expanded partial cross-sectional view through my invention, taken as on the line 2—2 of FIG. 3 in the direction indicated by the arrows thereon.

FIG. 3 is an orthographic view looking upwardly at the auxiliary knob structure of FIG. 1, taken as on a line 3—3 on FIG. 1 in the direction indicated by the arrows thereon.

FIG. 4 is a view similar to FIG. 3, looking upwardly at the lower surface of the auxiliary knob, but with other attached structure removed to show the lower surface of the auxiliary knob.

FIG. 5 is a diagram, in normal symbology, of the electrical circuitry of my invention.

FIG. 6 is a view looking upwardly at the auxiliary knob structure of FIG. 2 showing the U shaped clamp.

DESCRIPTION OF THE PREFERRED EMBODIMENT

My invention generally comprises auxiliary knob 10 carried for limited pivotal motion on fastening bracket 11 which in turn carries sensing structure 12 to sense direction of the last pivotal motion of the auxiliary knob.

Auxiliary knob 10 is formed by structurally intercommunicating top 13 and vertically depending cylindrical side 14. The outer peripheral surface of side 14 is sized and provided with alternating indentations 15 and protuberances 16 to aid grasping and manual manipulation thereof. The medial portion of knob top 30 defines axially aligned fastening bolt hole 17 extending therethrough to allow mechanical interconnection of the fastening bracket therewith.

Both knob top 13 and vertical side 14 are relatively thin elements, as illustrated, to define medial knob chamber 18 on the underside of the auxiliary knob, when that knob be normally oriented as illustrated. Lower surface 19 of top 13 provides four spaced, angularly arrayed stops 20 depending a spaced distance below top 19 to accept the back of fastening bracket 11 between the diametrically opposed pairs of stops to limit angular motion of the auxiliary knob relative to the bracket within limits of approximately thirty degrees. Diametrically opposed cylindrical lugs 58 depend medially between pairs of stops a distance somewhat less than that of the stops to cooperate with interfitting holes 57 defined in the upper surface of the fastening bracket to indicate rotary position of the knob in a counter clock-wise direction relative to the fastening bracket and aid in releasably maintaining that position. Depending cylindrical supports 59 depend from the lower surface 19 of cap top 13 the same distance as lugs 58 to aid the support of the auxiliary knob on the fastening bracket, when the elements be in the opposite angular relatioship with the fastening bracket and against the other pair of stops 20.

The inner surface of auxiliary knob side 14 carries elongate permanent magnet 43, immediately adjacent one corner of a sensing board carried in the knob chamber, to operate a position sensitive magnetic switch carried by the sensing board as hereinafter further specified. The configuration of this magnet is not critical but it must be positioned as indicated for my device to be operative.

The auxiliary knob is formed of rigid material of reasonable strength and durability appropriate to perform the functions required of it, commonly metal or a reasonably rigid polymeric or resinous material. The exact configuration and sizing of the auxiliary knob is not critical, but its external surface should be such as to allow ready and conform grasping and manual manipulation by an average operator. Preferably the various external corners and edges of the knob are rounded to aid their grasping in a comfortable manner. The size of the internal chamber and of the depending stops again is not critical so long as the related parts interfit and move as specified, but with ordinary materials and normal functioning they should be sized and configured approximately as illustrated in the drawings.

Fastening bracket 11 comprises a "U" shaped clamp formed by structurally interconnected back 22 and similar opposed, perpendicularly extending legs 23. The area of communication 24 of legs 23 with back 22 is preferably somewhat rounded to provide additional strength, rigidity and appropriate configuration to accept a sensor board between the legs as hereinafter specified. Fastening bolt hole 31 is defined in the medial part of back 22 of the fastening bracket, in a position that aligns with hole 17 of the auxiliary knob top when the bracket be operatively positioned relative thereto as illustrated. The top also defines two holes 57 appropriately sized and positioned to accept lugs 58 on the undersurface of the auxiliary knob top therein to indicate and releasably maintain angular positioning of the knob in a valve opening direction relative the fastening bracket.

The lower portion of each of the legs is configured to define similar convex protuberances 25 to engage and conformably fit about the periphery of a control knob of a gas valve to be serviced. The medial portions of each leg define similar aligned, cooperating tightening bolt holes 27 to accept tightening bolt 28 therebetween with threadedly engaged wing nut 29 on the outer surface of one leg, all to adjustably move the legs toward each other responsive to nut manipulation for releasably fastening of the bracket on a valve knob to be serviced. Preferably washers 30 are interposed between the outer surface of each leg and the outwardly adjacent bolt-nut structures for ease of operation.

Fastening bolt 55 is engaged through bolt hole 17 in the top of the auxiliary knob, fastening hole 31 in the fastening bracket, and through a sensor board hereinafter described with nut 56 threadedly engaged thereon beneath the lower side of the sensor board to mechanically interconnect these elements in releasable pivotal fashion as illustrated in FIG. 2. Spacing washers 53 are carried on bolt 32 between the lower fastening bracket surface and the sensor board top to maintain spacing of these elements and aid their pivotal motion relative each other. Cylindrical compression spring 60 with washer 61 on its lower surface are both carried on fastening bolt 55 immediately below the sensor board. Spring 60 must allow sufficient vertical motion of the auxiliary knob away from the fastening bracket to allow lugs 58 to be removed from their containing holes 57 so that the knob may be pivotally moved from an angular null position to an extreme position against either opposed pair of lugs 20. The nature of these elements and their joinder by bolt-nut combination 55, 56 should be such as to mechanically interconnect the elements but yet allow the motions specified of th auxiliary knob relative to the fastening structure.

The dimensioning and configuration of the fastening structure is not critical so long as it fulfill the purposes specified. The diameter of top 22 and the distance between fastening bracket legs 23 in their upper portion must be such as to allow pivotal motion of the bracket within internal chamber 18 defined by the auxiliary knob. Preferably the upper portion of the fastening bracket will be nearly the size of that internal chamber to increase strength, durability and rigidity of the entire device. The distance between inner surfaces of leg protuberances 25 and the length of tightening bolt 28 must be such as to allow the control knob of a serviced valve to be carried between the protuberances. Preferably fastening structure 11 is formed, substantially as illustrated, from mild steel strip, though undoubtedly other materials of sufficient strength, rigidity and other physical characteristics might serve the purposes of my invention, if not so well. It is convenient if the material of the bracket has some elastic resilience and be formed with a slightly greater distance between inner surfaces of protuberances 25 than the diameter of a valve handle to be serviced.

Sensing structure 11 provides relatively thin, sheetlike sensor board 32 of square configuration with truncated corners 33. The sensor board is dimensioned so that truncated corners 33 will fit in pivotal adjacency with the inner surface defining the medial chamber in the auxiliary knob, as illustrated particularly in FIG. 2.

The sensor board defines medial fastening bolt hole 34 at its center. It is configured as a square with truncated corners and its width is slightly greater than the distance between internal surfaces of the upper portions of legs 23 of the fastening bracket with bracket leg notches 54 defined in opposed sides of the board to receive the bracket legs so that the sensor board may be non-pivotally carried therebetween as illustrated particularly in FIG. 3. The sensor board is positionally maintained by fastening bolt 55 and associated nut 56 carried therebelow as hereinbefore described.

The sensor board supports the various sensing and annunciating elements of my invention. Battery 36 is releasably carried by resiliently deformable clip 54 which is mechanically fastened to the sensor board. One pole of the battery communicates electrically by connector wire 37 with one pole of normally open, magnetically operable, position sensing reed switch 38. The other second pole of the reed switch communicates by line 39 to solid state timing device 40 which in turn communicates with annunciator 41. This annunciator in turn communicates with the second pole of the battery by connector line 42 to complete the circuitry. This circuitry provides all of its elements in series connection so that when reed switch 38 closes to pass current, annunciator 41 will annunciate, in the case illustrated audibly at periodic intervals determined by timing device 40.

Reed switch 38 is of a type having magnetically permeable reed elements that are moved to close in a magnetic field. Such a magnetic field is provided by permanent magnet 43 carried on the inner surface of side 14 which defines chamber 18 in the auxiliary knob. The reed switch is physically positioned in immediate proximity to the corner of the sensor board that is positioned most proximately to the associated magnet, as illustrated especially in FIG. 2. As the reed switch pivots to approach magnet 43 it will be closed thereby, against its bias, to pass current and as it leaves the field of that magnet it will be biased to its normally open state. This type of magnetically operated reed switch is known in the existing electro-mechanical arts and is therefore not illustrated or specified in detail. The electronic timing device that passes periodic pulses of current responsive to a continuous current supply is also well known in the prior art, and therefore not specified in detail.

Having thusly described the structure of my invention, its operation may be understood.

A typical compressed gas cylinder and associated valving structure are shown in FIG. 1. Gas cylinder 44 defines internal chamber 45 for gas containment and upper medial neck 46 which is threaded to receive gas valve 47. The traditional valve 47 for compressed gas tanks as known in the prior art provides body 48 which is threadedly engagable upon neck 46 of the gas cylinder 44 in a gas-tight fit. Control knob 49 is irrotatably carried on stem 50 which is threadedly engaged in the valve body to move linearly relative thereto upon rotary motion. Gas exit conduit 51 communicates through and from the valve body to associated delivery conduit 52, commonly a pressurized gas hose, which transmits the released gas for further use at a distance. This much of the gas valving structure is common to most compressed gas valves no matter how the valving structure itself operates. Most such valves are of the conic type, some are ball valves, and some may be gate or butterfly valves, but all operate responsively to the rotation of some type of a valve knob, commonly a disk-like knob of the type illustrated. My invention is operative with such pivotally operable valve knobs no matter what the nature of the actual valving mechanism associated therewith may be.

To use my invention, a structure is created according to the foregoing specification and assembled as indicated. Fastening nut 29 is loosened to allow placement of control knob 49 of valve 47 to be serviced within protuberances 25 and between fastening legs 23 of my device. The fastening legs preferably have sufficient elastic resilience to allow them to expand away from each other as the fastening bolt nut is screwed outwardly on the fastening bolt, but if not, the legs are appropriately manually manipulated to allow such placement.

After placement of my invention, it is manually maintained in the position aforesaid, with diametrically opposed portions of primary valve knob 49 between protuberances 25 defined by the fastening legs, and the fastening nut 29 is then tightened to releasably fasten the device on the control knob of the valve to be serviced. When so fastened, my invention is ready for use.

To use gas from cylinder 44, valve structure 47 is operated by manually manipulating auxiliary knob 10 of my invention. The auxiliary knob in its null or closed condition normally will be in its extreme clockwise position as viewed from above relative to the fastening bracket and in this position the bracket back will be at a spaced distance beneath the undersurface of the auxiliary knob with the knob supports 59 contacting the bracket back to maintain this position against bias of spring 60. When the auxiliary knob is turned in a direction to open the associated valve, normally in a counter-clockwise direction when viewed from above, auxiliary knob 10 will pivot relative to sensor board 32 and fastening structure 11 carrying it until the auxiliary knob is stopped by the back of the fastening bracket coming into contact with stops 20 depending from the knob top. At this point the fastening bracket back will have moved from support on supports 59 and lugs 58 will have moved over holes 57 in the bracket back. By reason of bias of spring 60, the auxiliary knob and fastening bracket will move toward each other and into immediate adjacency to maintain this angular position of the elements until the knob lugs 58 be moved out of holes 57 against the lugs of spring 60. This provides a safety feature for my valve in that it cannot be accidentally dislodged from an operative annunciating position.

As the counter clock-wise motion of the auxiliary knob occurs, reed switch 38 will approach magnet 43 and as it enters the field of that magnet the switch will change from its normally open condition to a closed condition. As the switch changes state, electric current will pass from battery 36 through the reed switch, to timing device 40 and thence through annunciator 41 as permitted by the timing device. As this occurs, the annunciator will function periodically, as determined by the timing device 40, to annunciate the open condition of primary gas valve structure 47.

It is to be noted that if auxiliary knob 10 is moved in a direction to open an associated gas valve structure, my device will annunciate no matter whether the valve has been opened or how much it has been opened and it will, therefore, serve as an indicator also of the partially open condition of the valve and the passage or potential passage of gas through it.

When it be desired to shut off passage of gas through gas valve structure 47, this again is accomplished by appropriate manual manipulation of auxiliary knob 10. As the auxiliary knob is raised upwardly against its spring bias and lugs 58 depending from the auxiliary knob moved out of holes 57 in the back of the fastening bracket it may be turned in a direction to shut off the associated primary valve, normally clockwise as viewed from above. When this occurs my auxiliary knob 10 will again pivot relative to fastening structure 11 carrying it, so that reed switch 38 will move most distally from magnet 43 to be free of the influence of its magnetic field and assume its normally biased open condition. The switch will open to stop the passage of electric current to the annunciator and thusly cause the annunciation to cease operation.

The lug and support structure 57, 58, 59 carried by the fastening bracket and auxiliary knob respectively will tend to maintain these elements in an extreme angular position in the direction in which the knob must move to open a valve to be serviced to lessen any potentiality of accidental displacement. The structure also will tend to allow a user to know that an extreme position has been reached or exists since the knob must be moved axially against its spring bias to allow it to be moved from a valve opening direction.

A battery condition warning device (not shown), of type known in the prior art, may be installed in the electrical circuitry of my invention, if desired, to indicate battery condition. This obviously is not necessary to the operation of my invention as it assumes an operable battery and lack of operation is readily determinable.

It is to be particularly noted from the foregoing description that my invention requires no specialized structure, modification or change in a gas valve which it is to service. It rather is an entirely self-contained device that may be releasably attached to any ordinary gas valve.

It is further to be noted that my invention may be used with most types of gas valves that operate by a reversible pivotal motion of a knob or handle so long as the fastening structure of my invention be appropriately adopted and configured to interconnect with the structure causing valve operation. Normally, however, in most existing gas valves, that structure causing operation will be a round knob sized and configured for manual manipulation.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters patent, and

What I claim is:

1. An annunciating device to indicate potential open condition of a valve having a control knob operated by reversible pivotal motion, comprising, in combination:
    an auxiliary knob carried for limited pivotal motion on the back of a "U" shaped fastening member having opposed elongate legs to releasably interconnect with a control knob of a valve to be serviced; and
    electrical switching means to sense auxiliary knob motion in one direction, associated electric circuitry to annunciate such sensed motion, and means of powering said electrical circuitry.

2. The invention of claim 1 further characterized by:

the electrical switching means comprising a magnetically sensitive switch that operates responsive to proximity to a source of magnetic energy.

3. An auxiliary knob structure to be releasably carried by a control knob of a rotatably operated valve to annunciate potential open condition of that valve, comprising, in combination:

an auxiliary knob pivotally carrying an associated fastening structure, stop means limiting pivotal motion of the associated fastening structure, and means to operate a position sensing switch;

a "U" shaped fastening structure, pivotally carried by the auxiliary knob with opposed legs extending from the auxiliary knob, said legs having means of releasably fastening to a control knob of a valve to be serviced; and sensing structure including a sensor board carried adjacent the auxiliary knob by the fastening structure to pivot therewith and, said sensor board carrying a position sensitive switch to sence pivotal motion of the auxiliary knob in one direction; and electrical circuitry including a power source communicating in series through the position sensitive switch to a timing device which communicates in series to an annunciator to annunciate the condition sensed by the position sensitive switch.

4. An auxiliary knob structure releasably positionable upon the control knob of a valve, that pivots in opposite directions to cause valve operation, to annunciate the potential open condition of that valve, comprising in combination:

an auxiliary knob defining a downwardly opening internal chamber with stops depending from the knob top into the chamber to limit the pivotal motion of an associated fastening structure relative thereto, magnetic means carried by the chamber defining knob surface to operate a position sensing switch, and means of fastening an associated fastening structure thereto for limited pivotal motion;

A "U" shaped fastening structure, having a flat back portion pivotally carried in the internal chamber of the auxiliary knob with similar spaced fastening legs extending from the back, said fastening legs having medial cooperating tightening bolt holes with a tightening bolt and threadedly engaged nut extending operatively therebetween, and similar outwardly convex protuberances in their lower portions to aid releasable fastening about a control knob of a valve to be serviced; and sensing structure including a rigid sensing board, carried in the internal chamber of the auxiliary knob and between the fastening structure legs to pivot therewith, said sensor board carrying a normally open, magnetically operable switch adapted to close in proximity to the magnetic means carried by the auxiliary knob, and associated sensing and annunciating circuitry including an electric powering source communicating in series with the magnetically operable switch, a timing device, and an annunciator to annunciate upon proximity of the said switch to the said magnet means.

5. The invention of claim 4 further characterized by:

the means pivotally fastening the auxiliary knob and the fastening structure comprising a bolt and nut combination and compression spring therebetween biasing said knob and fastening structure toward each other, the auxiliary knob and fastening structure having lugs and accommodating holes defined on adjacent surfaces of said structures to releasably maintain the structures in a valve opening direction unless moved both axially and pivotally against the bias of the aforesaid spring.

* * * * *